United States Patent
Chen et al.

(12) 
(10) Patent No.: US 12,277,799 B2
(45) Date of Patent: Apr. 15, 2025

(54) VIDEO IMAGE COMPOSITION METHOD AND ELECTRONIC DEVICE

(71) Applicant: AmTRAN Technology Co., Ltd., New Taipei (TW)

(72) Inventors: Yen-Chou Chen, Taipei (TW); Chui-Pang Chiu, New Taipei (TW); Che-Chia Ho, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 386 days.

(21) Appl. No.: 17/804,100

(22) Filed: May 26, 2022

(65) Prior Publication Data

US 2023/0237838 A1 Jul. 27, 2023

(30) Foreign Application Priority Data

Jan. 24, 2022 (TW) .................................. 111103019

(51) Int. Cl.
*G06V 40/16* (2022.01)
*G10L 15/25* (2013.01)

(52) U.S. Cl.
CPC .......... *G06V 40/166* (2022.01); *G06V 40/172* (2022.01); *G10L 15/25* (2013.01)

(58) Field of Classification Search
None
See application file for complete search history.

(56) References Cited

U.S. PATENT DOCUMENTS

| | | | |
|---|---|---|---|
| 6,567,775 B1* | 5/2003 | Maali | G06V 20/40 704/231 |
| 10,304,458 B1* | 5/2019 | Woo | G10L 17/02 |
| 2013/0216206 A1* | 8/2013 | Dubin | G11B 27/031 386/282 |
| 2015/0189233 A1* | 7/2015 | Carpenter | H04N 7/15 348/E7.083 |
| 2016/0371534 A1* | 12/2016 | Koul | G06F 18/2411 |
| 2017/0244930 A1* | 8/2017 | Faulkner | H04N 7/147 |
| 2018/0376108 A1* | 12/2018 | Bright-Thomas | G06V 20/40 |
| 2019/0222892 A1* | 7/2019 | Faulkner | H04N 21/4314 |
| 2019/0273767 A1* | 9/2019 | Nelson | H04M 7/0027 |
| 2019/0379839 A1* | 12/2019 | Hellerud | G01L 17/005 |
| 2020/0026729 A1* | 1/2020 | Narasimha | G06F 16/7867 |

(Continued)

FOREIGN PATENT DOCUMENTS

| | | | |
|---|---|---|---|
| CN | 109413359 A | | 3/2019 |
| CN | 109819195 B | * | 1/2021 |
| TW | 201901527 A | | 1/2019 |

*Primary Examiner* — Guillermo M Rivera-Martinez
(74) *Attorney, Agent, or Firm* — CKC & Partners Co., LLC

(57) ABSTRACT

The present disclosure provides a video image composition method including the following steps. A priority level list is obtained, and the priority level list includes multiple priority levels of multiple person identities. Multiple video streams are received. Multiple identity labels corresponding to human face frame images from the video streams are determined. The multiple display levels of the human face frame images are determined according to the identity labels and priority level list. A part of the human face frame images being in speaking status are detected. At least one of the part of the human face frame images being in speaking status is constituted as a main display area of a video image, according to the display levels.

15 Claims, 11 Drawing Sheets

(56) References Cited

U.S. PATENT DOCUMENTS

| | | | |
|---|---|---|---|
| 2020/0186649 A1* | 6/2020 | Zheng | H04M 3/567 |
| 2020/0344278 A1* | 10/2020 | Mackell | H04N 7/15 |
| 2021/0185276 A1* | 6/2021 | Peters | G06V 20/41 |
| 2021/0399911 A1* | 12/2021 | Jorasch | H04L 12/1822 |

* cited by examiner

VIDEO IMAGE COMPOSITION METHOD AND ELECTRONIC DEVICE

RELATED APPLICATIONS

This application claims priority to Taiwan Application Serial Number 111103019, filed Jan. 24, 2022, which is herein incorporated by reference.

BACKGROUND

Field of Invention

The present disclosure relates to a video image composition method. More particularly, the present disclosure relates to the video image composition method and an electronic device.

Description of Related Art

In techniques of nowadays video conferences, if a participant is to be assigned to give a talk in a video conference, there usually name the participant through a voice. However, in a multi-person video conference, participants may ignore the voice because of noises from conversations their own or other situations in the conference. Furthermore, the participants may also ignore a talk given by a moderator in the multi-person video conference. In additional, it is hard to control a camera for the multi-person video conference to shot at the participant being questioned at the first timing when the participant has been named, the camera is usually adjusted to follow the participant after the participant start to give a talk.

Therefore, how to avoid the moderator being ignored when speaking or assign a participant to speak is an important issue in this technique field.

SUMMARY

The present disclosure provides a video image composition method. The video image composition method includes the following steps. A priority level list is received, and the priority level list includes a plurality of priority levels of a plurality of person identities. A plurality of video streams is received. A plurality of identity labels corresponding to a plurality of human face frame images in the video streams are identified. A plurality of display levels corresponding to the human face frame images are determined, according to the identity labels and the priority level list. A part of the human face frame images being in speaking status are detected. At least one of the part of the human face frame images being in speaking status is constituted as a main display area of a video image, according to the display levels.

The present disclosure provides an electronic device. The electronic device includes a memory device and a processing circuit. The processing circuit is configured the following steps. A priority level list are received, and the priority level list comprises a plurality of priority levels of a plurality of person identities. A plurality of video streams are received. A plurality of identity labels corresponding to a plurality of human face frame images in the video streams are identified. A plurality of display levels corresponding to the human face frame images are determined, according to the identity labels and the priority level list. A part of the human face frame images being in speaking status are detected. At least one of the part of the human face frame images being in speaking status is constituted as a main display area of a video image, according to the display levels.

In summary, the present disclosure provides the method and the device to determine the moderator with the highest display level in the video conference by face recognition, and the at least one of the human face frame images can be determined to be constituted as the main display area of the video image according to the part of the human face frame images being in speaking status and the display levels. Therefore, the participants can clearly notice the important message from the moderator.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1:
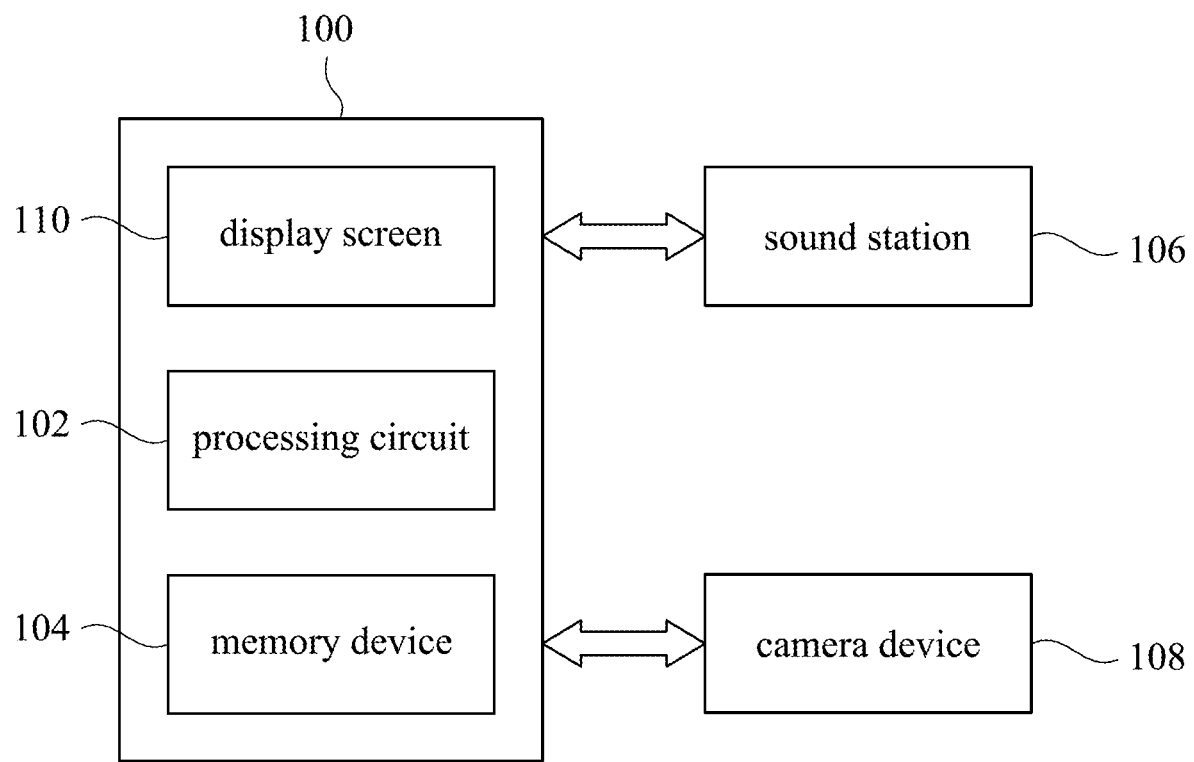
FIG. 1 depicts a schematic diagram of an electronic device according to some embodiment of the present disclosure.

Reference will now be made in detail to the present embodiments of the disclosure, examples of which are illustrated in the accompanying drawings. However, the embodiments provided herein are intended as illustrative only since numerous modifications and variations therein will be apparent to those skilled in the art. Description of the operation does not intend to limit the operation sequence. Any structures resulting from recombination of elements with equivalent effects are within the scope of the present disclosure. In addition, drawings are only for the purpose of illustration and not plotted according to the original size. Wherever possible, the same reference numbers are used in the drawings and the description to refer to the same or like parts for better understanding.

Terms used throughout the specification and the claims typically have common meanings for each of the terms used in this field, in the present disclosure and in special contents, unless specially noted.

Furthermore, it should be understood that the terms, "comprising", "including", "having", "containing", "involving" and the like, used herein are open-ended, that is, including but not limited to. It will be understood that, as used herein, the phrase "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 depicts a schematic diagram of an electronic device 100 according to some embodiment of the present disclosure. As shown in FIG. 1, the electronic device 100 includes a display screen 110, a processing circuit 102 and a memory device 104. In some embodiments, the electronic device 100 can be implemented by a computer, a laptop, a panel or other device being able to receive or transmit video stream. The processing circuit 102 can be implemented by processor, microprocessor or other element/component with the similar functions. The memory device can be implemented by a memory, cache, hardware or other element/component with the similar functions.

The electronic device 100 utilizes a sound station 106 to record a sound and/or determine a direction of a sound source. The electronic device 100 utilizes a camera device 108 to record video so as to generate a video stream. The electronic device 100 utilizes the display screen to display a video image. In other embodiments, the electronic device 100 can utilize external projector to display video/image. Therefore, it is not intended to limit configuration relationship between the sound station 106, the camera device 108 and the electronic device 100.

Figure 2A:
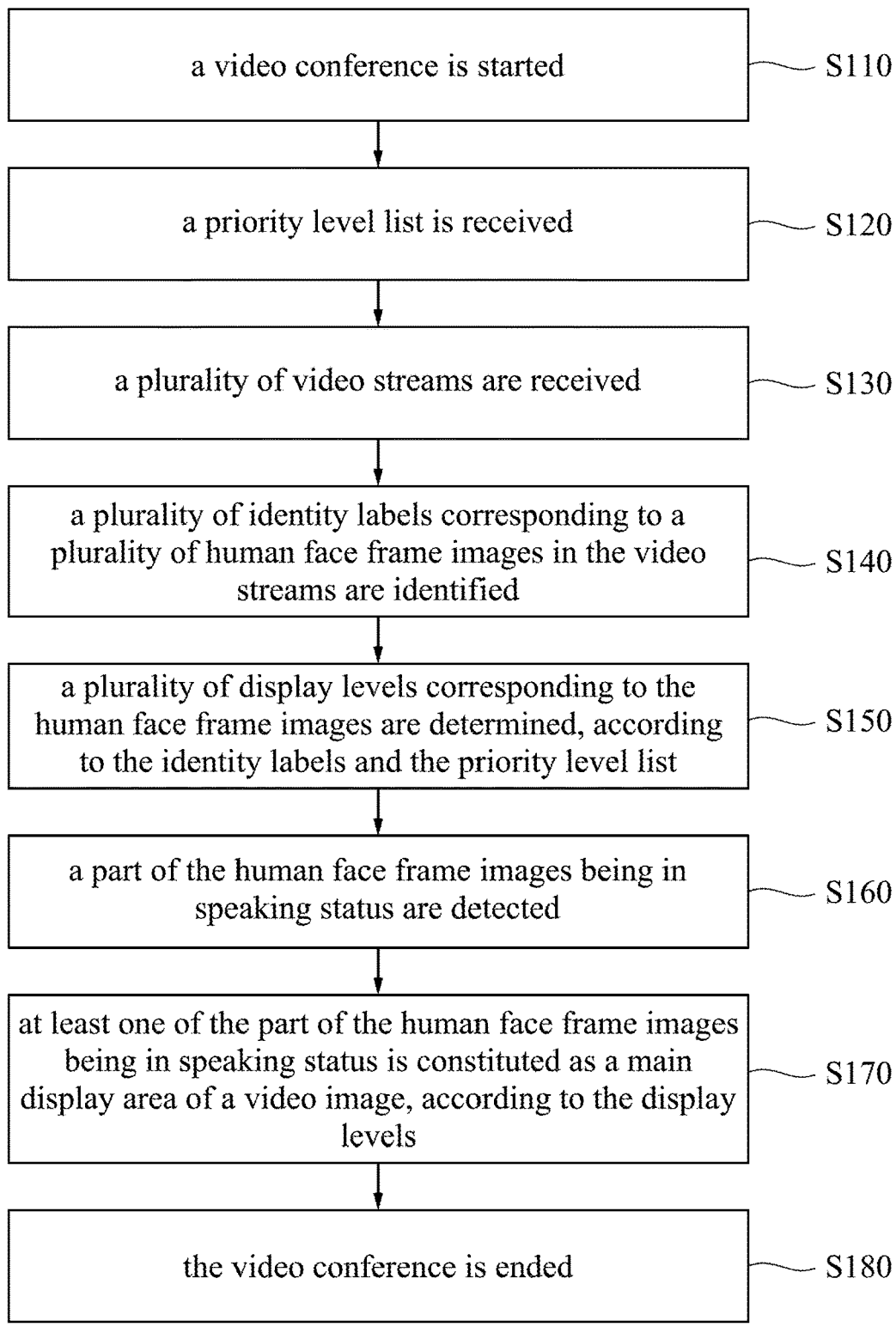
FIG. 2A depicts a flowing chart of a video image composition method according to some embodiment of the present disclosure.
Figure 2B:
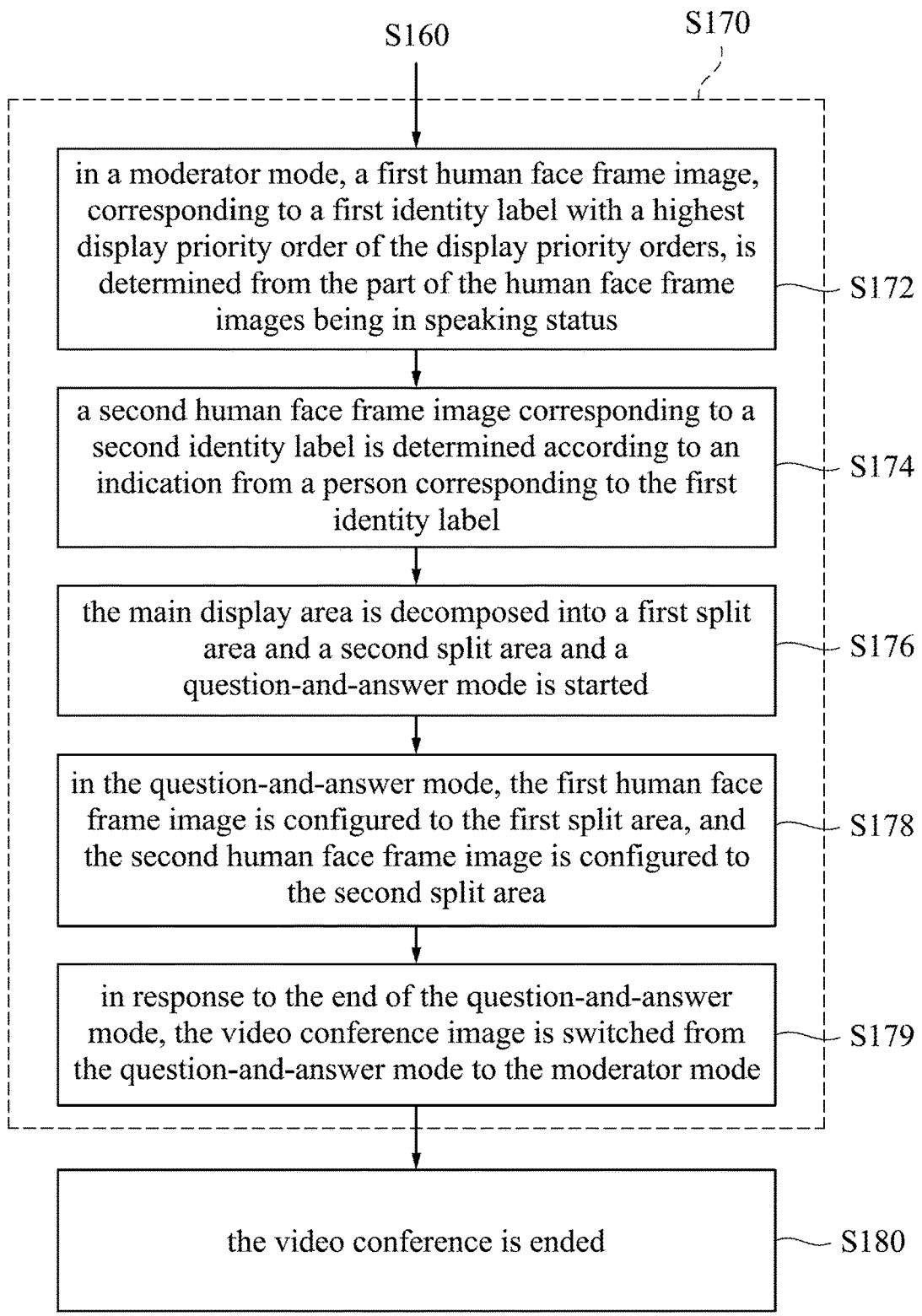
FIG. 2B depicts a flowing chart of step S170 in FIG. 2A according to some embodiment of the present disclosure.
Figure 2C:
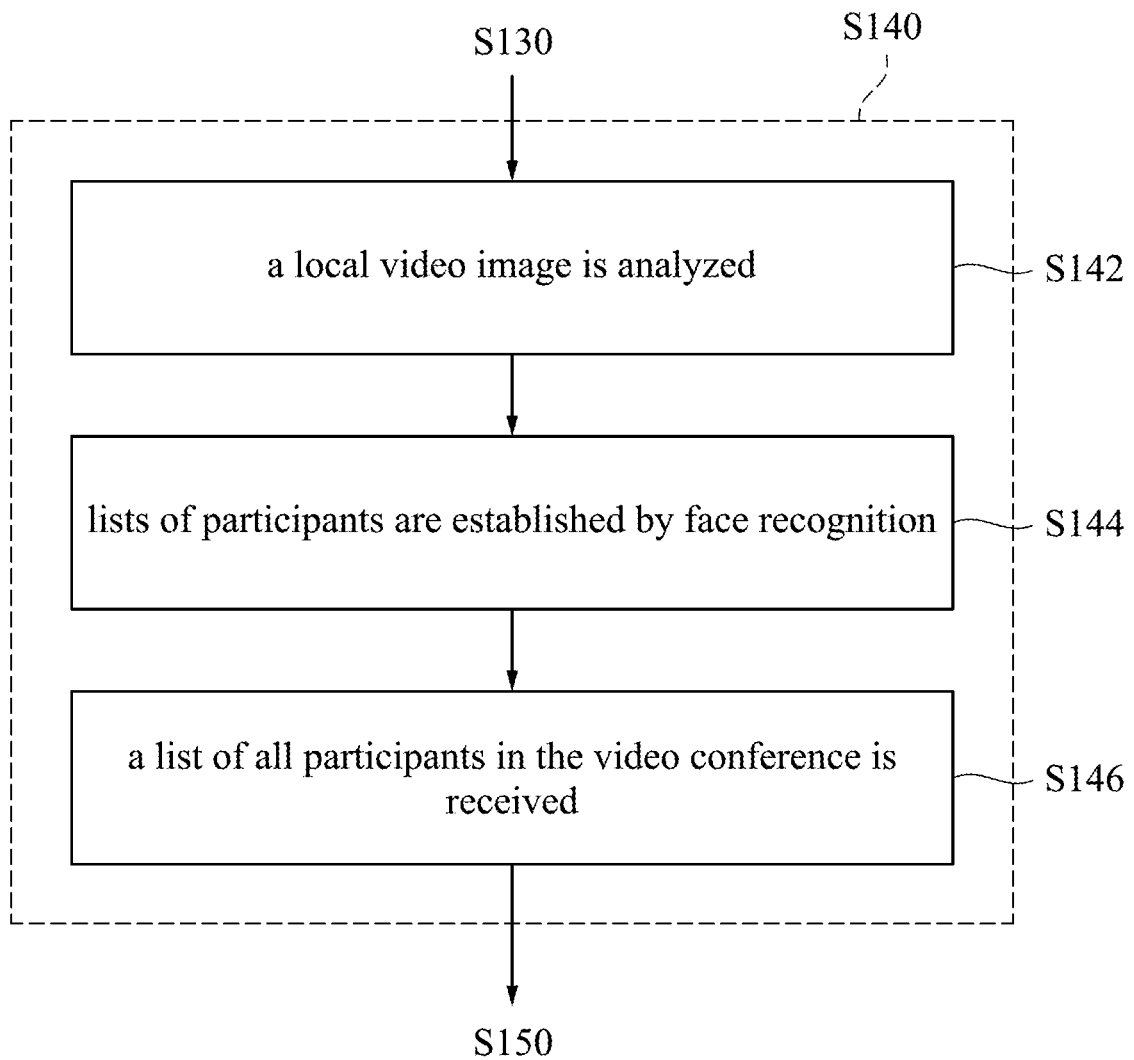
FIG. 2C depicts a flowing chart of step S140 in FIG. 2A according to some embodiment of the present disclosure.

For better understanding, reference is made to FIGS. 1, 2A~2C and 3~7. FIG. 2A depicts a flowing chart of a video image composition method S100 according to some embodiment of the present disclosure. FIG. 2B depicts a flowing chart of step S170 in FIG. 2A according to some embodiment of the present disclosure. FIG. 2C depicts a flowing chart of step S140 in FIG. 2A according to some embodiment of the present disclosure. The video image composition method S100 includes steps S110~S180. Step S170 includes steps S172~S179. Step S140 includes steps S142~S146. All of steps S110~S180, S142~S149 and S172~S179 can be performed by the processing circuit 102 of the electronic device 100.

Figure 3:
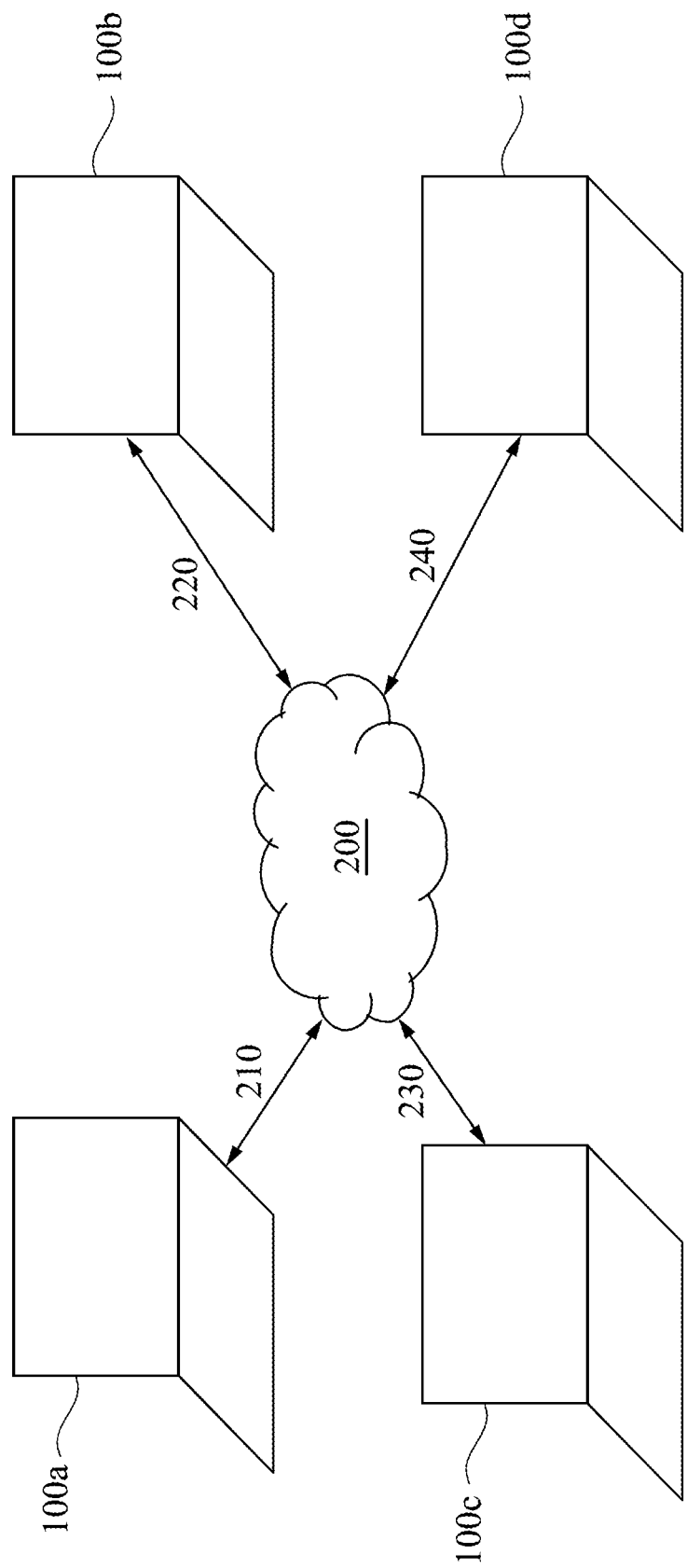
FIG. 3 depicts a schematic diagram of electronic devices and streams according to some embodiment of the present disclosure.
Figure 4:
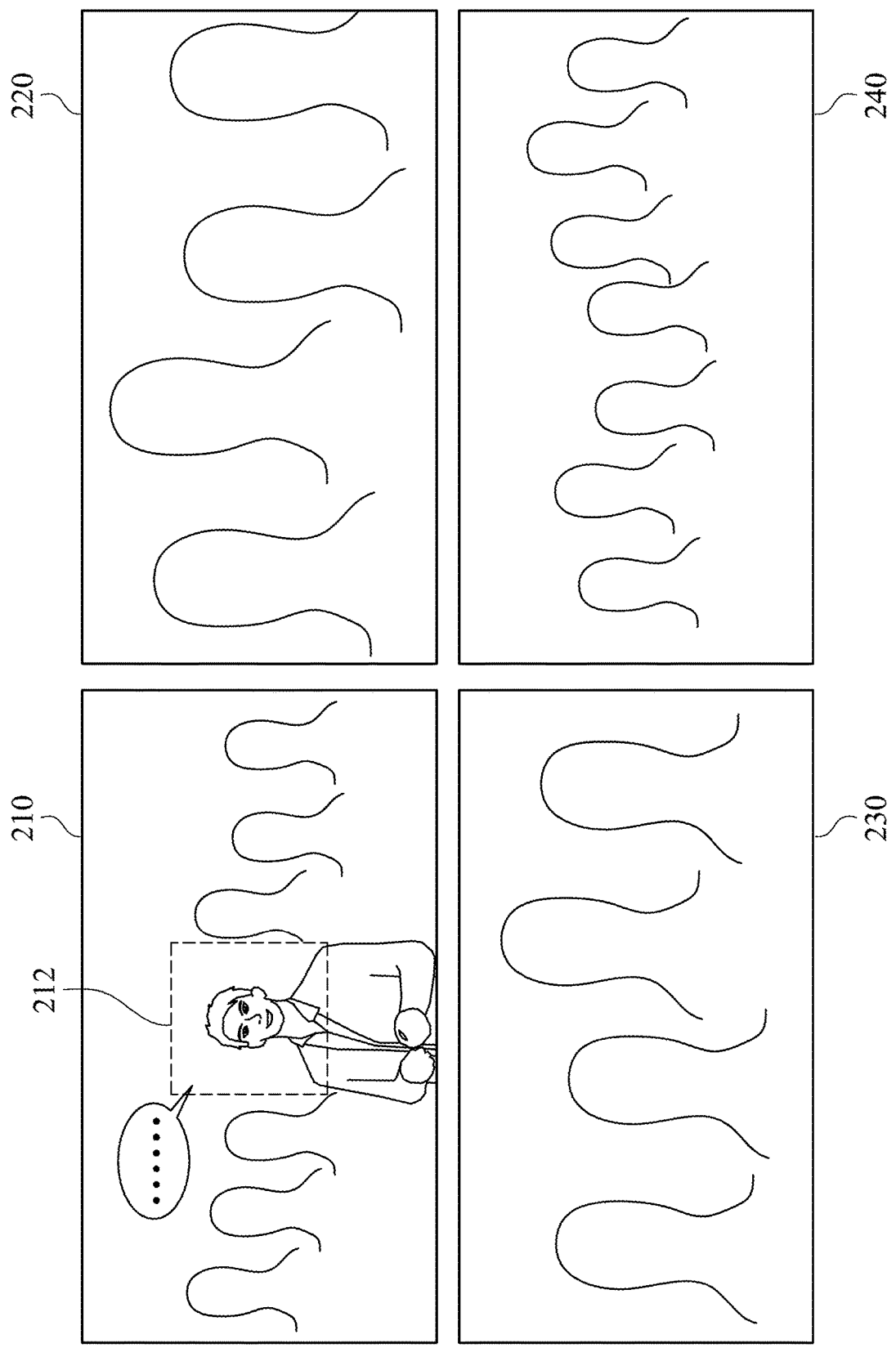
FIG. 4 depicts a schematic diagram of the streams at one point of time according to some embodiment of the present disclosure.
Figure 5:
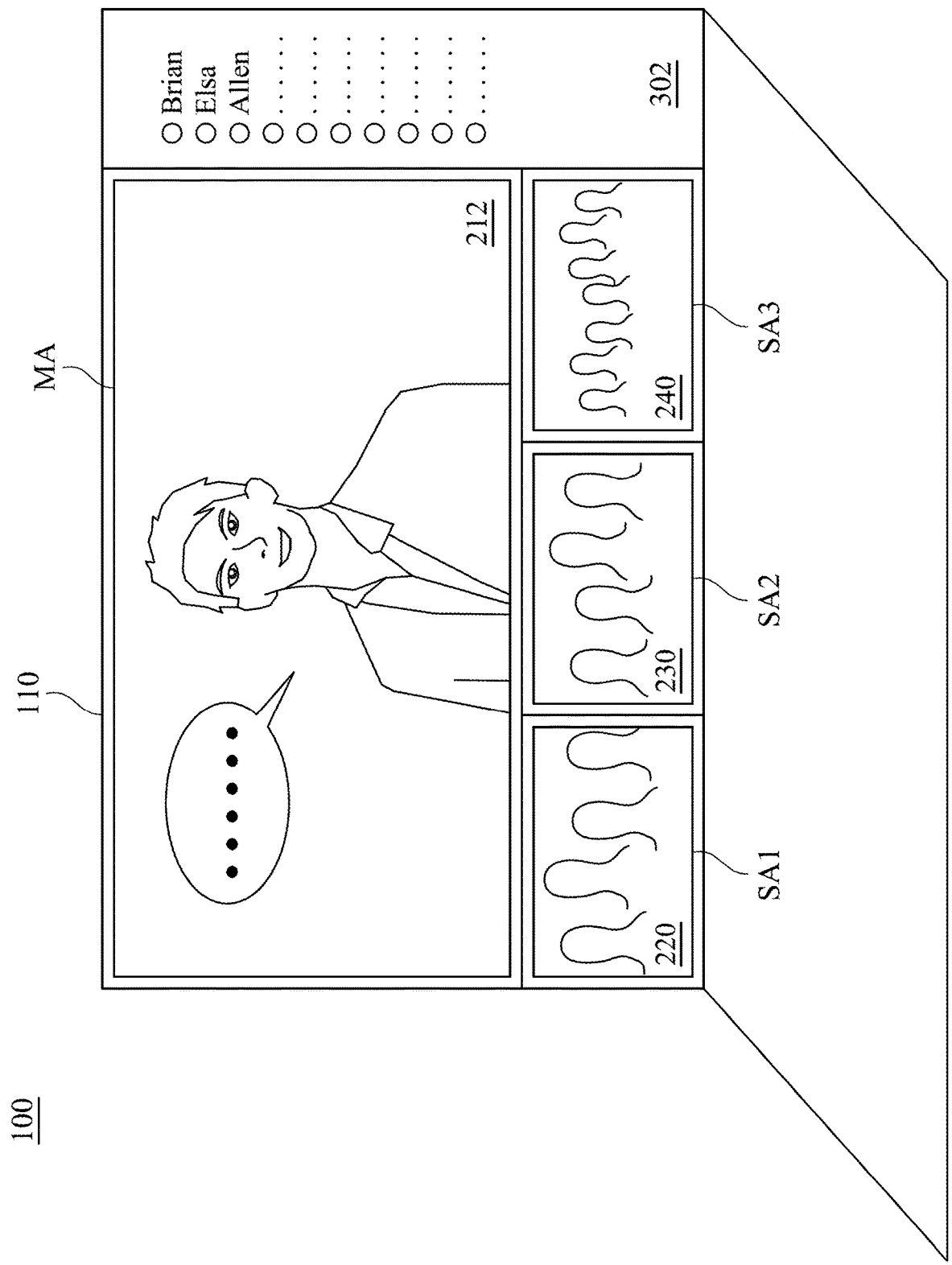
FIG. 5 depicts a schematic diagram of a display screen of an electronic device at the point of time in FIG. 4 according to some embodiment of the present disclosure.
Figure 6:
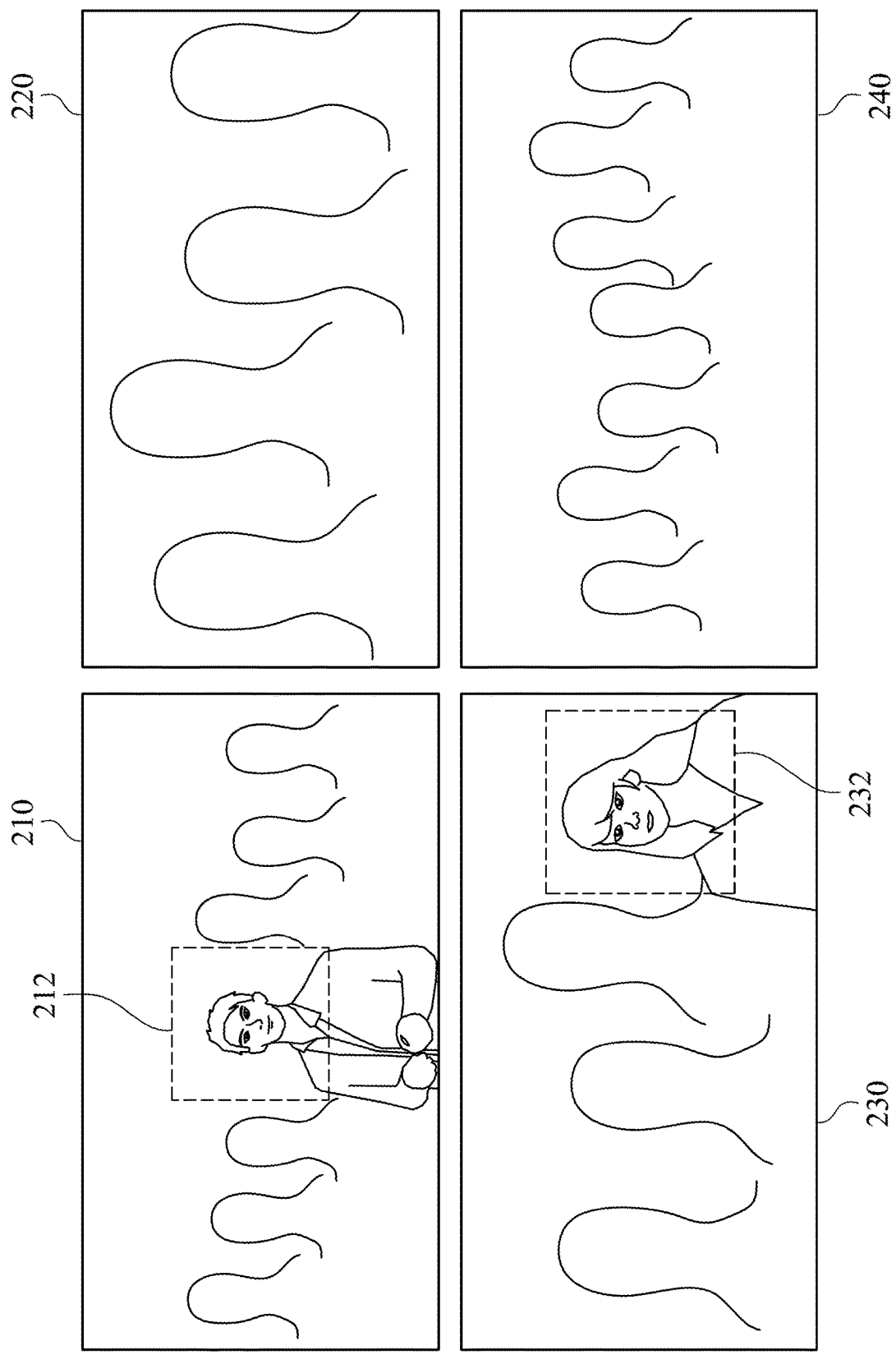
FIG. 6 depicts a schematic diagram of the video streams at the other point of time according to some embodiment of the present disclosure.
Figure 7:
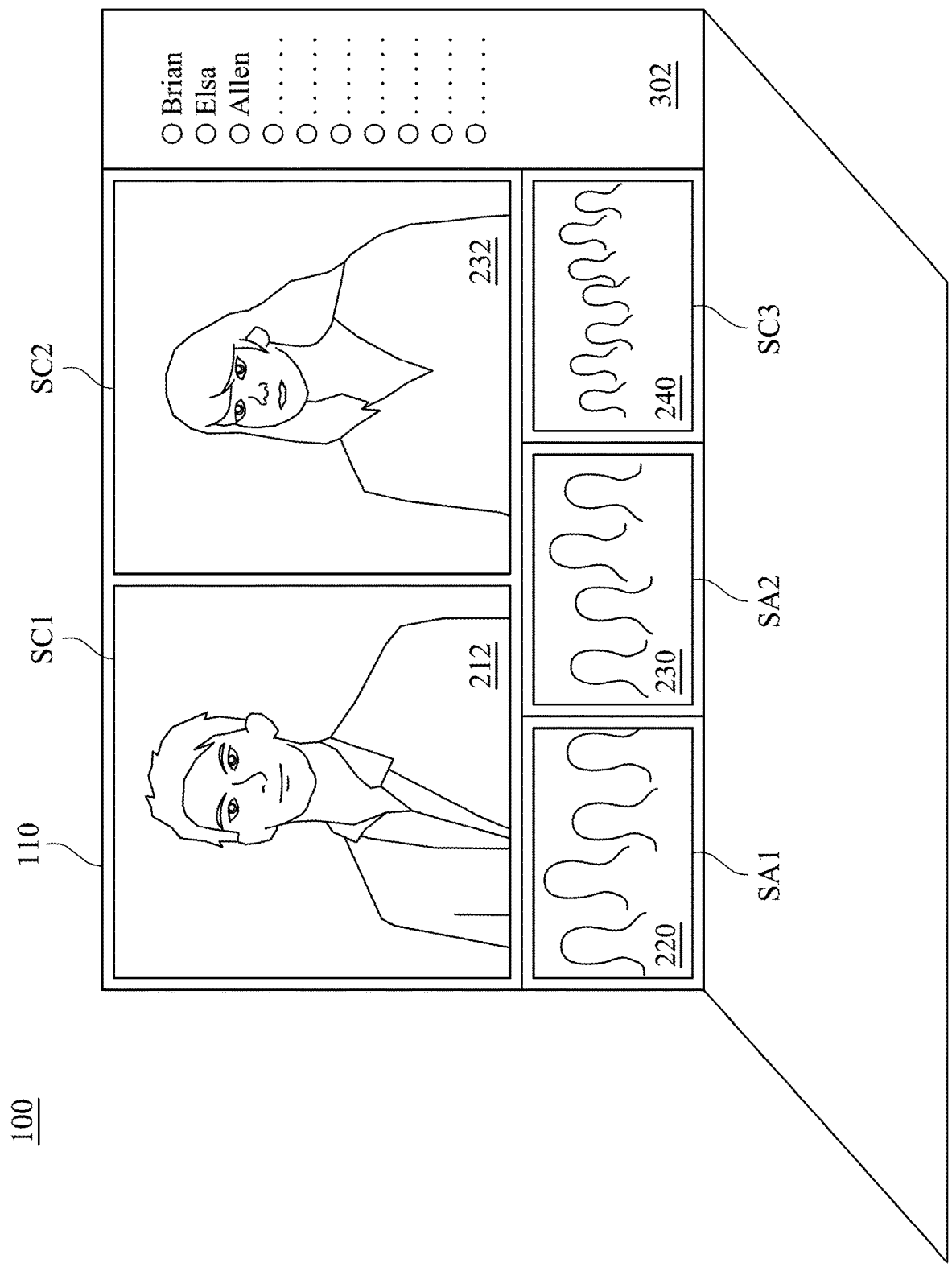
FIG. 7 depicts a schematic diagram of the display screen of the electronic device at the other point of time in FIG. 6 according to some embodiment of the present disclosure.

FIG. 3 depicts a schematic diagram of electronic devices 100a~100d and video streams 210, 220, 230 and 240 according to some embodiment of the present disclosure. FIG. 4 depicts a schematic diagram of the video streams 210, 220, 230 and 240 at one point of time according to some embodiment of the present disclosure. FIG. 5 depicts a schematic diagram of a display screen 110 of an electronic device 100 at the point of time in FIG. 4 according to some embodiment of the present disclosure. FIG. 6 depicts a schematic diagram of the video streams 210, 220, 230 and 240 at the other point of time according to some embodiment of the present disclosure. FIG. 7 depicts a schematic diagram of the display screen 110 of the electronic device 100 at the other point of time in FIG. 6 according to some embodiment of the present disclosure.

In step S110, a conference is started. Participants from different areas/spaces to join to the conference activates video conference software in the electronic devices 100a~100d, respectively. The electronic device 100a~100d can be implemented by the electronic device 100 in FIG. 1. Therefore, the description is omitted. The electronic devices 100a~100d utilize sound stations and camera devices to record videos and audios in each meeting places, in order to generate video streams 210, 220, 230 and 240. In other embodiments, when the conference is started and if all of participants are in the same meeting room/space, the electronic device 100 can utilize multiple camera devices and multiple sound stations to record videos and audios from the meeting room/space, in order to generate video streams 210, 220, 230 and 240.

In step S120, a priority level list is received. The content of the priority order list includes priority levels of multiple person identities. For example, the electronic devices 100a~100d can read/receive a personnel list of members in the company/school from database/memory device 104. In some embodiments, if the video conference is used for the members in the company, the priority levels of the person identities can be set according to job positions, such as, new employees, senior employees, department managers, managers, the president and the chairman may have different priority levels. In other embodiments, if the video conference is used for distance learning, the priority level of teacher can be set with high priority level, and the priority levels of students can be set with low priority levels.

To be noted that, the aforementioned priority levels of multiple person identities can be determined by face rigorization, and the human face features and the job position/identity and title/name can be recorded in the database in registration. After the video conference is started, the person identities of participants can be determined/recognized by face recognition without accounts of each participants. In some embodiments, the priority levels of person identities of the participants can be set according to job positions. In other embodiments, the priority levels of person identities of the participants can be adjusted according to the content in the current video conference.

In step S130, a plurality of video streams are received. The electronic devices 100a~100d transmit the video streams 210, 220, 230 and 240 through the network 200, and each electronic devices 100a~100d can receives the video streams 210, 220, 230 and 240 and to generate the video image, so as to start the video conference in a normal mode.

In step S140, a plurality of identity labels corresponding to a plurality of human face frame images in the video streams are identified. Reference is also made to FIG. 2C. Step S140 includes steps S142~S146.

In step S142, a local video image is analyzed. And lists of participants are established by face recognition in step S144. The electronic devices 100a~100d can perform face recognition for video image of the video streams 210, 220, 230 and 240. In other words, the electronic devices 100*a*~100*d* can compare each human face frame images, captured from the video streams 210, 220, 230 and 240, to the aforementioned face features of members in the database, so as to obtained multiple local participant lists. The content of the local participant lists includes person identities (such as name and job title) and priority levels of the participants.

In step S146, a list of participants in the video conference is received. In some embodiments, the electronic devices 100*a*~100*d* can transmit the local participant lists to each other, in order to obtain the person identities of all the participants from different venues in the current video conference, and the face rigorization for local video images can be correspondingly performed by electronic devices 100*a*~100*d* to reduce the computing cost. In other embodiments, the electronic devices 100*a*~100*d* can receive all of the video streams 210, 220, 230 and 240, and perform the face rigorization for all of local video images to obtain the list of participants in the current video conference. Therefore, it is not intended to limit the present disclosure.

In step S150, a plurality of display levels corresponding to the human face frame images are determined, according to the identity labels and the priority level list. In some embodiments, the display levels corresponding to the human face frame images can be determined by searching for the priority level list received in step S120 according to the identity labels (such as name or job positions). In other embodiments, the display levels of the participants can be set at the start of the video conference. Therefore, it is not intended to limit the present disclosure.

In step S160, a part of the human face frame images being in speaking status are detected. In a multi-person video conference, when participants are actively discussing the topic at the same time, the audio of the video conference may be mixed and inaudible. Therefore, the step S170 is performed, at least one of the part of the human face frame images being in speaking status is constituted as a main display area of a display screen, according to the display levels. As a result, since the main display area of the display screen is switched to the human face frame images with the highest priority level and being in speaking status, all of the participants in the video conference can note that the manager teacher or the moderator is speaking.

Step S170 includes step S172~S179. Reference is made to FIG. 2B. In step S172, in a moderator mode, a first human face frame image, corresponding to a first identity label with a highest display priority order of the display priority orders, is determined from the part of the human face frame images being in speaking status. Specifically, the electronic device 100 can utilize two-dimensional array of the sound station 106 to receive and determine sounds generated from different place of the venue, and the electronic device 100 compare the sound source direction to the video image, so as to determine which human face frame images being in speaking status. And, in the moderator mode, determine/select the one of the human face frame images being in speaking status with the highest display level.

For example, the electronic device 100 detect the first human face frame image 212 being in speaking status from the video streams 210, 220, 230 and 240. And, a first identity label corresponding to the first human face frame image 212 of the face frame images being in speaking status has the highest display level, and the first human face frame image 212 is configured to the main display area MA of the video image, as shown in FIG. 5.

In some embodiments, the camera device 108 has adjustable zoom lens, and the electronic device 100 can control a focus length of the camera device 108 to generate the first human face frame image 212 with higher resolution, and the electronic device 100 outputs the first human face frame image 212 as the video stream 210. In other embodiments, if the camera device 108 without adjustable zoom lens, the electronic device 100 can capture the first human face frame image 212 from the origin video stream and then enlarge and output the first human face frame image 212 as the video stream 210.

In the embodiment of FIG. 5, in the moderator mode, the video image includes a main display area MA and sub display areas SA1~SA3. The sub display areas SA1~SA3 can be used to configure the video streams 220, 230 and 240. In other embodiments, the video image in the moderator mode is constituted by the main display area without the sub display areas SA1~SA3, so as to display the first human face frame image 212 corresponding to the moderator, manager or teacher more clearly.

In step S174, a person corresponding to a second identity label is determined according to an indication from a person corresponding to the first identity label. In the embodiments of present disclosure, the person corresponding to the first identity label can indicate the other person corresponding to a second identity label.

In some embodiments, the indication from the person corresponding to the first identity label can be received by the sound station 106. In other words, the sound station 106 can receive a sound signal from the person corresponding to the first identity label. The sound signal includes contents of the second identity label (such as the name or job position of the person who has been named) and a keyword to start a question-and-answer mode. For example, when the sound station 106 receives the sound signal from the sound source direction corresponding to the first human face frame image with the first identity label, the electronic device 100 analysis the sound signal and obtains the words "answer" and "Elsa" from the sound signal. Therefore, the person with the first identity label can indicate the person to answer by the voice. In other embodiments, the person with the first identity label can click the account avatar (such as the account avatar in the account avatar list 302 displayed by the display screen 110) to indicate the person, or can directly click the human face frame image of the participant in the video image to indicate the person with the second identity label.

In step S176, the main display area (the main display area MA as shown in FIG. 5) is decomposed into a first split area (the first split area SC1 as shown in FIG. 5) and a second split area (the second split area SC2 as shown in FIG. 5) and a question-and-answer mode is started, as shown in FIG. 7.

In step S178, in the question-and-answer mode, the first human face frame image 212 is configured to the first split area SC1, and the second human face frame image 232 is configured to the second split area SC2. As a result, the time for search the moderator or the person to be indicated can be shortened in the question-and-answer process of the video conference. In some embodiments, when the processing circuit 102 receives the indication to indicate the person with the second identify label, an edge region of the electronic device 100 located at where the person with the second identify label can blink lights to alert the person, to improve the conference process.

For example, the electronic device 100 detects that the person with the first identity label corresponding to the first human face frame image 212 indicates the other person with the second identity label (such as, Elsa), in the embodiment of the video streams 210, 220, 230, and 240 as shown in FIG. 6. In the embodiment of FIG. 7, the first human face frame image 212 is configured to the first spilt area SC1 of the video image, and the second human face frame image 232 corresponding to the second identity label (such as, Elsa) is configured to the second spilt area SC2 of the video image.

Similarly, in some embodiments, the second human face frame image 232 can be captured by controlling the focus length of the camera device 108 by the electronic device 100. In other embodiments, the second human face frame image 232 can be enlarged and outputted the electronic device 100.

In step S179, in response to the end of the question-and-answer mode, the video conference image is switched from the question-and-answer mode to the moderator mode. Specifically, in response the end of the question-and-answer mode, the video conference image is switched back to the moderator mode to combine the first spilt area SC1 and the second split area SC2 to the main display area MA, and the first human face frame image is configured to the main display area MA. And then, step S174 can be performed, the other participant can be indicated to enter the question-and-answer mode, or step S180 can be performed, the video conference is ended.

Figure 8:
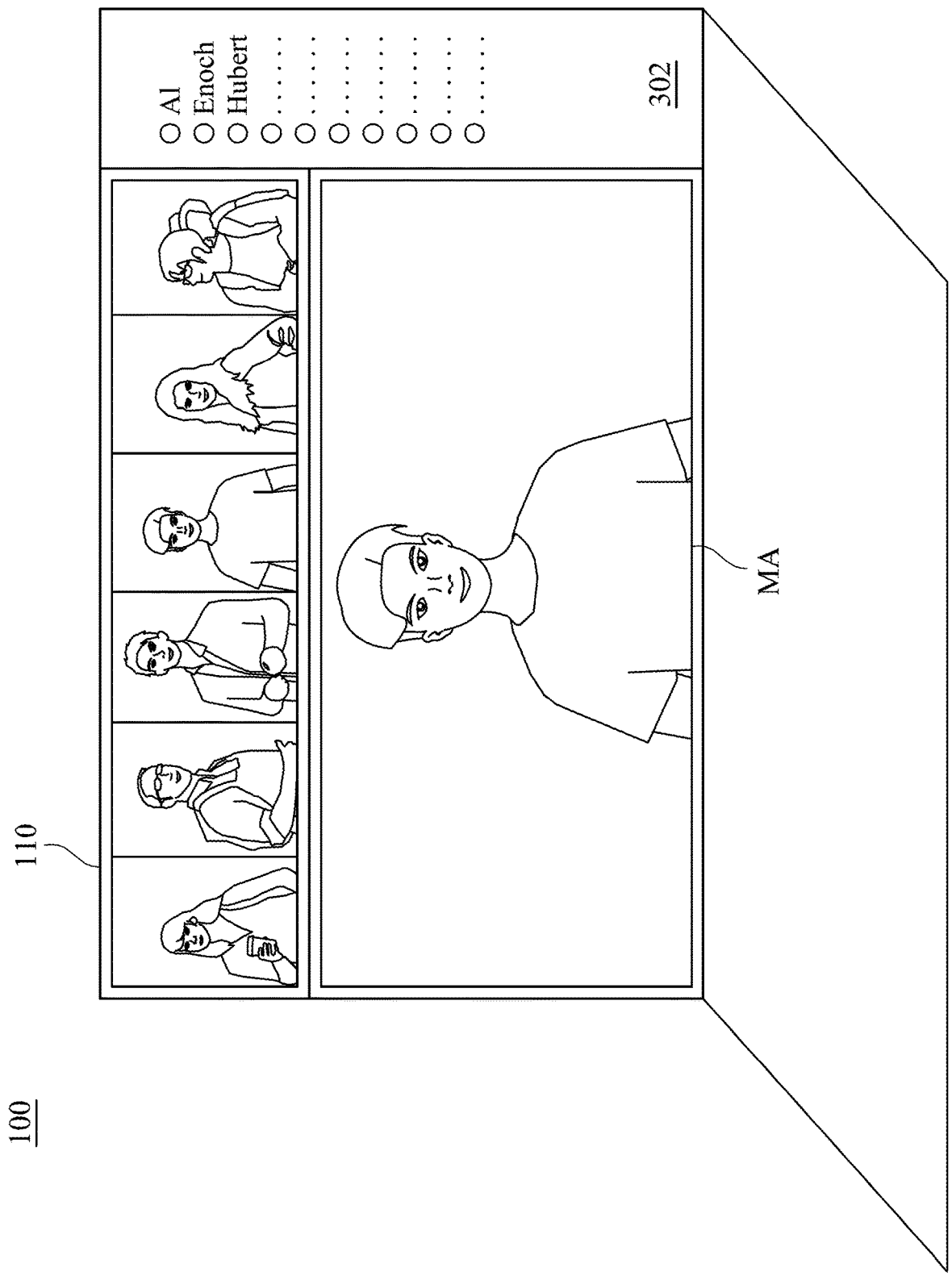
FIG. 8 depicts a schematic diagram of a display screen of an electronic device according to some embodiment of the present disclosure.
Figure 9:
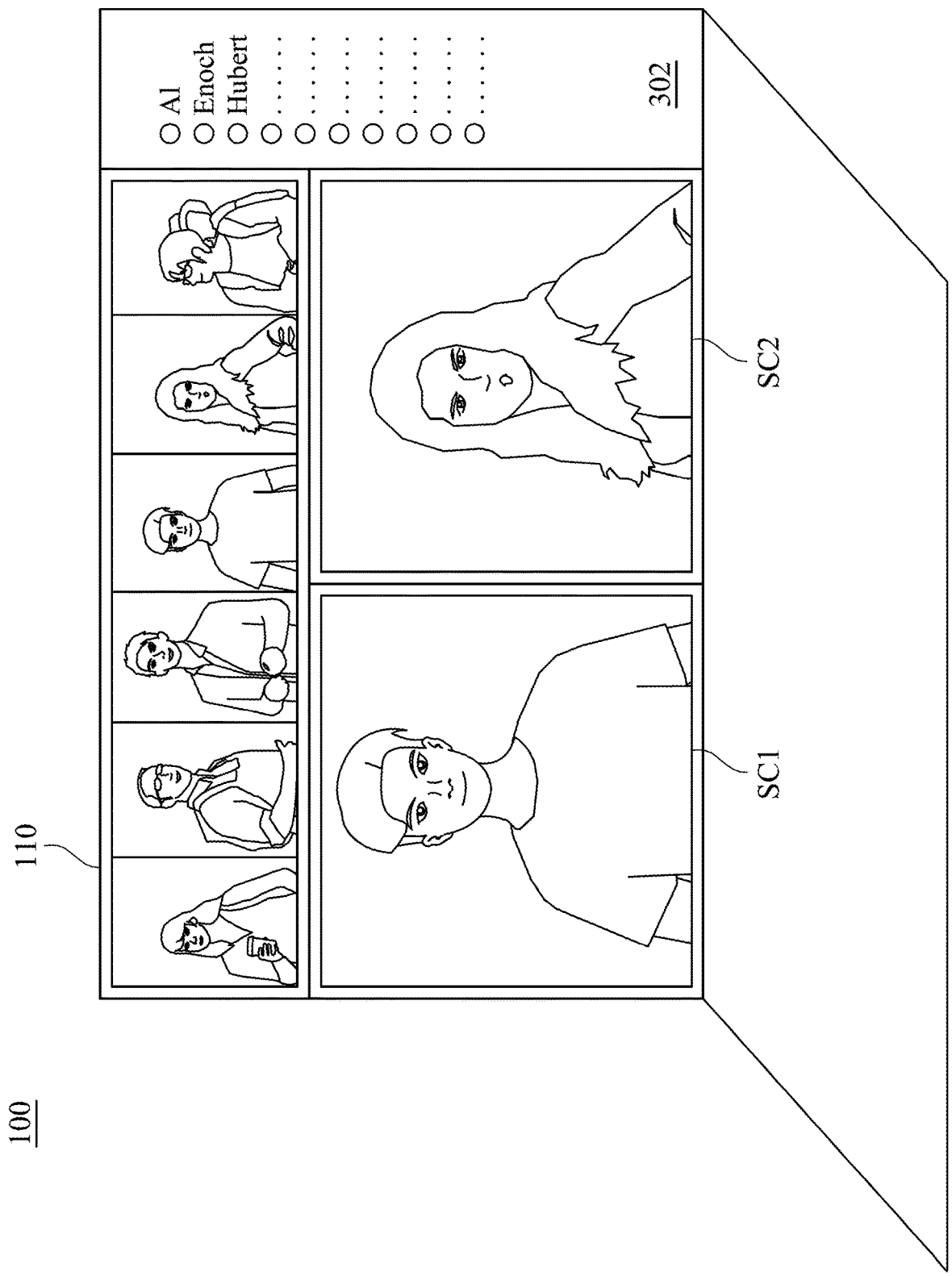
FIG. 9 depicts a schematic diagram of a display screen of an electronic device according to some embodiment of the present disclosure.

FIG. 8 depicts a schematic diagram of a display screen 110 of an electronic device 100 according to some embodiment of the present disclosure. FIG. 9 depicts a schematic diagram of a display screen 110 of an electronic device 100 according to some embodiment of the present disclosure. In the embodiments in FIG. 5 and FIG. 7, the participants in the same venue use the same sound station. In the embodiments in FIG. 8 and FIG. 9, in the conditions that the output image of each video streams includes a single participant, the video streams with the participant, being in speaking status can be detected directly, and then the video stream with a participant corresponding to the highest display level can be determined. The other operation manner in the embodiments in FIG. 8 and FIG. 9 are similar to the embodiments in FIG. 5 and FIG. 7, and therefore the embodiments in FIG. 8 and FIG. 9 can be performed by steps S110~S180.

In summary, the embodiments of the present disclosure provide the method to receive the data of the identities and corresponding face features of pre-registration members, and the moderator with the highest display level on the video conference can be determined in the moderator mode, so as to configure the human face frame image of the moderator to the main area MA of the video image during the moderator being in speaking status. Therefore, the participants can clearly notice the important message from the moderator. Furthermore, when the moderator with the highest display level indicates the participant to answer, the electronic device 100 can switch the video image to the question-and-answer mode in response to the indication from the moderator, so as to simultaneously display the human face frame images correspond to the moderator (questioner) and the person been indicated. Therefore, the conference process can be improved. And, since the video image can be automatically switched, the situation that the participants need to determine who is the moderator or the person been indicated by themselves can be avoid, and each of participants can synchronize the conference process.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A video image composition method, comprising:
receiving a priority level list, wherein the priority level list comprises a plurality of priority levels of a plurality of person identities;
receiving a plurality of video streams;
identifying a plurality of identity labels corresponding to a plurality of human face frame images in the video streams;
determining a plurality of display levels corresponding to the human face frame images, according to the identity labels and the priority level list;
detecting a part of the human face frame images being in speaking status;
constituting at least one of the part of the human face frame images being in speaking status as a main display area of a video image, according to the display levels; and
in a moderator mode, determining a first human face frame image from the human face frame images being speaking, wherein the first human face frame image is corresponding to a first identity label comprising a highest display priority order of the display levels.

2. The video image composition method of claim 1, further comprising:
in the moderator mode, configuring the first human face frame image to the main display area of the video image.

3. The video image composition method of claim 1, further comprising:
determining a second human face frame image corresponding to a second identity label according to an indication from a person corresponding to the first identity label, and wherein in response to the indication, decomposing the main display area into a first split area and a second split area and starting a question-and-answer mode.

4. The video image composition method of claim 3, further comprising:
in the question-and-answer mode, configuring the first human face frame image to the first split area, and configuring the second human face frame image to the second split area.

5. The video image composition method of claim 4, further comprising:
in response to end of the question-and-answer mode, switching the question-and-answer mode back to the moderator mode, to combine the first split area and the second split area into the main display area.

6. The video image composition method of claim 3, wherein the indication from the person corresponding to the first identity label is a sound source signal received by a sound station.

7. The video image composition method of claim 6, wherein the sound source signal comprises the second identity label and a keyword of the question-and-answer mode.

8. An electronic device, comprising:
a memory device; and
a processing circuit, configured to:

receiving a priority level list, wherein the priority level list comprises a plurality of priority levels of a plurality of person identities;

receiving a plurality of video streams;

identifying a plurality of identity labels corresponding to a plurality of human face frame images in the video streams;

searching the priority level list for the priority levels according to the identity labels to determine a plurality of display levels corresponding to the human face frame images;

detecting a part of the human face frame images being in speaking status; and constituting at least one of the part of the human face frame images being in speaking status as a main display area of a video image, according to the display levels.

9. The electronic device of claim 8, wherein the processing circuit is configured to:

in a moderator mode, determining a first human face frame image from the human face frame images being speaking, and wherein the first human face frame image is corresponding to a first identity label comprising a highest display level of the display levels.

10. The electronic device of claim 9, wherein the processing circuit is configured to:

in the moderator mode, configuring the first human face frame image to the main display area of the video image.

11. The electronic device of claim 10, wherein the processing circuit is configured to:

determining a second human face frame image corresponding to a second identity label according to an indication from a person corresponding to the first identity label, and wherein in response to the indication, decomposing the main display area into a first split area and a second split area and starting a question-and-answer mode.

12. The electronic device of claim 11, wherein the processing circuit is configured to:

in the question-and-answer mode, configuring the first human face frame image to the first split area, and configuring the second human face frame image to the second split area.

13. The electronic device of claim 12, wherein the processing circuit is configured to:

in response to end of the question-and-answer mode, switching the question-and-answer mode back to the moderator mode, to combine the first split area and the second split area into the main display area.

14. The electronic device of claim 11, wherein the indication from the person corresponding to the first identity label is a sound source signal received by a sound station.

15. The electronic device of claim 14, wherein the sound source signal comprises the second identity label and a keyword of the question-and-answer mode.

\* \* \* \* \*